United States Patent
Lee et al.

(10) Patent No.: US 7,916,734 B2
(45) Date of Patent: Mar. 29, 2011

(54) METHOD FOR DETERMINING TRANSMISSION PATH OF ROUTER SYSTEM

(75) Inventors: Jong-kuk Lee, Daejeon-si (KR);
Sang-sig Nam, Daejeon-si (KR);
Ki-dong Nam, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 157 days.

(21) Appl. No.: 12/079,112

(22) Filed: Mar. 25, 2008

(65) Prior Publication Data

US 2009/0059926 A1    Mar. 5, 2009

(30) Foreign Application Priority Data

Sep. 3, 2007  (KR) .................. 10-2007-0089207

(51) Int. Cl.
*H04L 12/56* (2006.01)
(52) U.S. Cl. .................................. 370/395.32
(58) Field of Classification Search .......... None
See application file for complete search history.

(56) References Cited

U.S. PATENT DOCUMENTS

| | | | |
|---|---|---|---|
| 5,178,135 A | 1/1993 | Uchiyama et al. | |
| 5,938,600 A | 8/1999 | Van Vaals et al. | |
| 6,661,787 B1* | 12/2003 | O'Connell et al. | 370/389 |
| 7,317,721 B1* | 1/2008 | Sindhu et al. | 370/389 |
| 2003/0088174 A1 | 5/2003 | Sussman et al. | |
| 2004/0019447 A1 | 1/2004 | Shachar | |
| 2005/0010686 A1* | 1/2005 | Nishida et al. | 709/238 |
| 2005/0083839 A1* | 4/2005 | Singh et al. | 370/230 |
| 2006/0023676 A1 | 2/2006 | Whitmore et al. | |
| 2006/0209788 A1* | 9/2006 | Boldt et al. | 370/352 |
| 2007/0211730 A1* | 9/2007 | Cuthbert et al. | 370/395.53 |

FOREIGN PATENT DOCUMENTS

| | | |
|---|---|---|
| EP | 1 110 508 A2 | 6/2001 |
| KR | 2002-0094840 | 12/2002 |
| KR | 2004-0046424 | 6/2004 |
| WO | WO 97/22015 | 6/1997 |
| WO | WO 2004/075987 A1 | 9/2004 |

OTHER PUBLICATIONS

S. Deering, Xerox Parc, R. Hinden, Ipsilon Networks, Dec. 1995, "Internet Protocol, Version 6 (IPv6) Specification" Deering & Hinden, Standards Track, pp. 1-37.

* cited by examiner

*Primary Examiner* — Chirag G Shah
*Assistant Examiner* — Amarnauth Persaud
(74) *Attorney, Agent, or Firm* — Blakely, Sokoloff, Taylor & Zafman LLP

(57) ABSTRACT

Disclosed is a method for determining a transmission path of a router system, in which a forwarding table of the router system is managed with a dualized address system including an absolute address indicating a physical port and a relative address indicating the place of the absolute address. Only the absolute address in a relative forwarding table can be changed without changing the relative address when traffic congestion occurs on a certain port of the router system or when load-balancing is needed, so that the router can actively cope with a real-time change of a destination address.

10 Claims, 6 Drawing Sheets

METHOD FOR DETERMINING TRANSMISSION PATH OF ROUTER SYSTEM

CROSS REFERENCE TO RELATED APPLICATIONS

This application claims priority from Korean Patent Application No. 10-2007-0089207, filed on Sep. 3, 2007, the disclosure of which is incorporated herein in its entirety by reference.

BACKGROUND OF THE INVENTION

1. Field of the Invention

The present invention relates to a method for determining a transmission path of a router system, and more particularly to a method for determining an efficient packet-transmission path of a router system in a multicast operation.

2. Description of the Related Art

FIG. 1 is a schematic block diagram of a router system. The router system includes a routing processor (RP) 100, at least one linecard processor (LP) 200 provided with a port to be connected to a network or a host and functioning as an external interface, and a switch (SW) 300 setting a packet transmission path under control of the routing processor (RP) 100. The routing processor (RP) uses a forwarding table to set the transmission path when transmitting packets.

Referring to FIG. 2, a conventional forwarding table includes an Internet Protocol (IP) address, a media access control (MAC) address, and a physical port.

FIG. 3 is a flowchart illustrating a procedure for determining a transmission path of a conventional router system. In packet transmission, the routing processor (RP), which is responsible for general routing control in the router system, retrieves a destination address with reference to the forwarding table at operation S110. Here, the destination address can be retrieved by comparing with the IP address or the MAC address in the forwarding table shown in FIG. 2.

If the destination address is not retrieved at operation S110, the routing processor (RP) records the destination address in the forwarding table at operation S210, and sets a default physical port as a transmission path to transmit a packet at operation S220. On the other hand, if the destination address is retrieved at operation S110, the routing processor (RP) sets the physical port, which corresponds to the destination address recorded on the forwarding table, as the transmission path to transmit the packet at operation S310.

Such a conventional method for determining the transmission path of the router system is easy to manage and operate. However, the conventional method has difficulty in instantly coping with and supplementing traffic congestion, which may occur in a certain port, since it is necessary to change the port in the forwarding table in order to perform load-balancing in the event that traffic congestion occurs on the port. In other words, since the router system needs to stop operations of the higher routing/forwarding processors before changing the port in order to change the forwarding table occupied by higher routing/forwarding processors, the changeover operation is not easy.

Furthermore, in a multicast operation, if the router system contains no forwarding table for supporting multicasting, an extra forwarding engine for multicasting needs to be provided in the forwarding table and each port needs to have a forwarding table record. In the case where the router system has 32 ports which are destination ports for packet transmission, the corresponding multicast addresses need to have 32 forwarding table records.

However, in multicast communication where session participants (subscribers) frequently join and withdraw, the router system experiences a heavy load because the forwarding table record has to be changed accordingly.

SUMMARY OF THE INVENTION

The present invention is conceived to solve the foregoing problems, and an aspect of the present invention is to provide a method for determining a transmission path of a router system that can instantly cope with traffic congestion, which may occur on a certain port, while efficiently performing load-balancing in a multicast operation.

In accordance with one aspect of the present invention, the above and other aspects can be accomplished by the provision of a method for determining a transmission path of a router system, including: retrieving an address corresponding to a destination address with reference to a forwarding table; determining whether the address is an absolute address or a relative address, if the address corresponding to the destination address exists in the forwarding table; and determining a transmission path depending on an absolute address recorded on the forwarding table, if the address corresponding to the destination address is an absolute address.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

When packet transmission is requested, a router system determines a transmission path prior to transmitting a packet. According to the present invention, a forwarding table has an address system of an absolute address, which indicates a physical port, and a relative address, which indicates the location of the absolute address.

Figure 4:
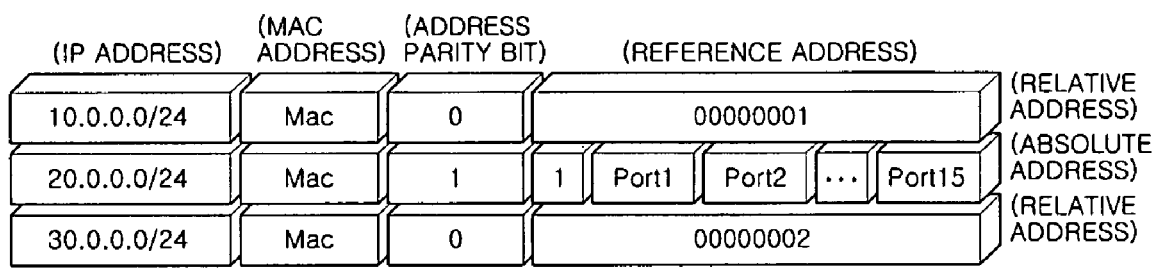
FIG. 4 illustrates a forwarding table used in determining a transmission path of a router system according to an exemplary embodiment of the present invention.
Figure 5:
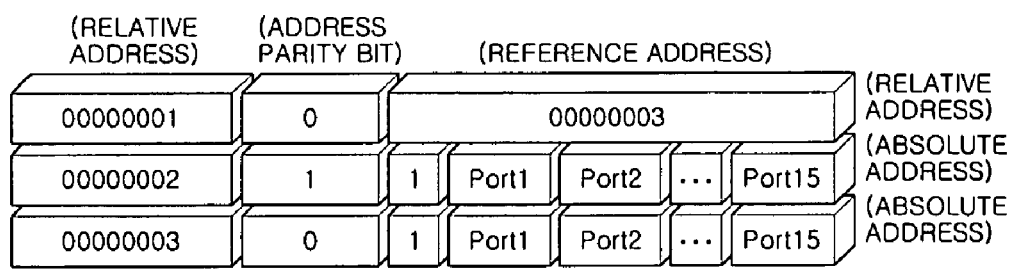
FIG. 5 illustrates a relative forwarding table used in determining the transmission path of the router system according to an embodiment of the present invention.

FIGS. 4 and 5 illustrate a forwarding table and a relative forwarding table, respectively, which are used in determining a transmission path of a router system according to an embodiment of the present invention.

Figure 1:
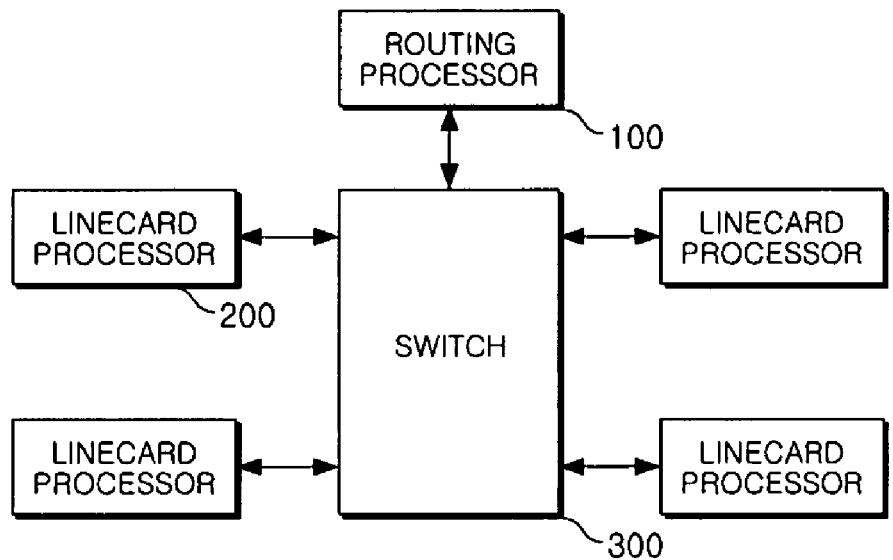
FIG. 1 is a schematic diagram of a router system.
Figure 2:
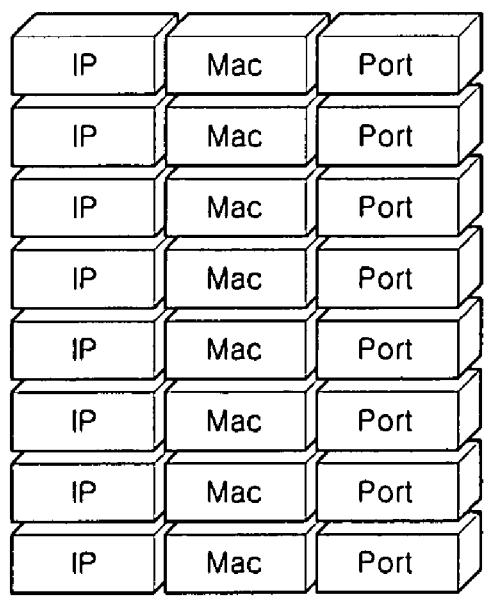
FIG. 2 illustrates a forwarding table used in determining a transmission path of a conventional router system.
Figure 3:
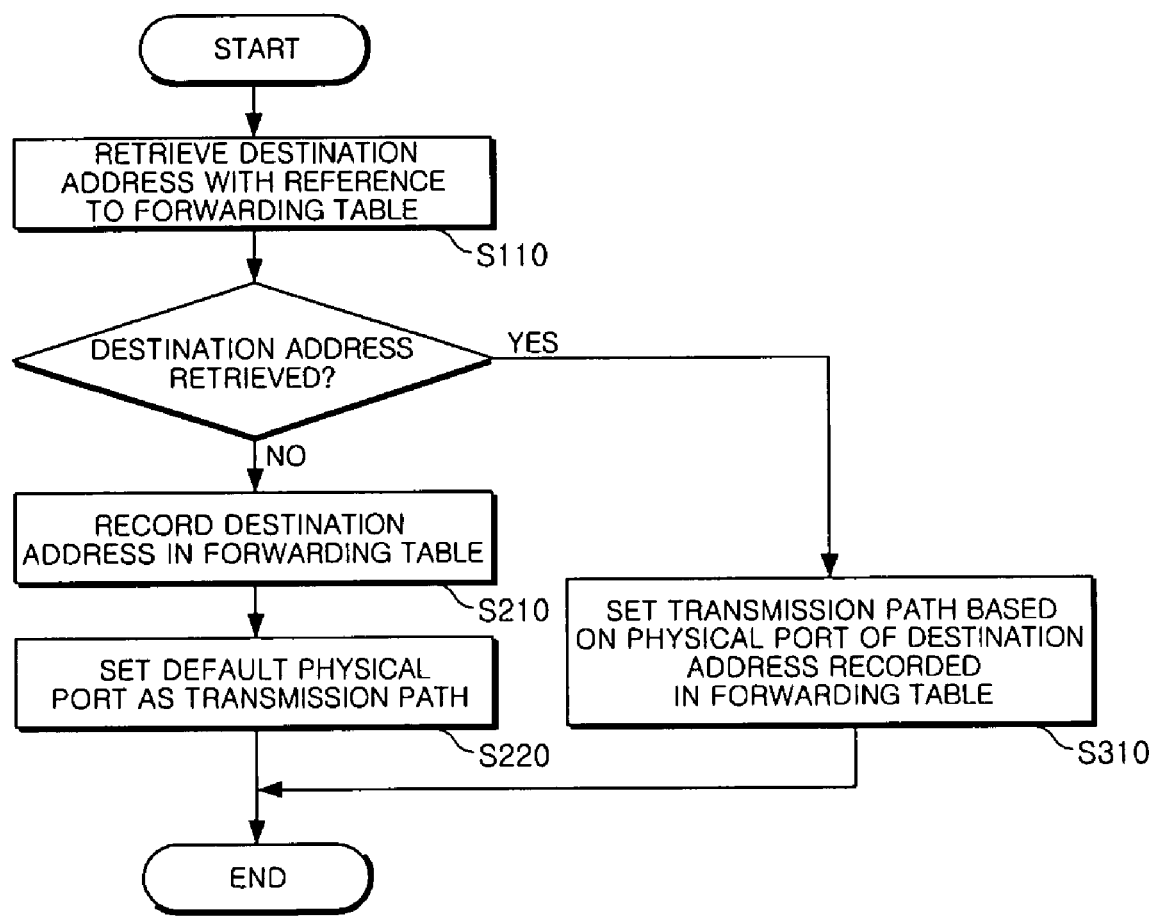
FIG. 3 is a flowchart illustrating a procedure for determining the transmission path of the conventional router system.

Referring to FIG. 4, the forwarding table includes an Internet Protocol (IP) address, a Media Access Control (MAC) address, an address parity bit, and a reference address. The IP address is an address used by a network layer of Open Systems Interconnection (OSI) 7 Layer. The MAC address is an address used by a data link layer. The address parity bit indicates whether an address is an absolute address or a relative address. For example, an address parity bit of '1' means that the address recorded on the reference address field is an absolute address, while an address parity bit of '0' means that the address recorded on the reference address field is a relative address. As compared with the conventional forwarding table that includes the IP address, the MAC address, and the physical port as shown in FIG. 2, the forwarding table according to the present embodiment further includes an address parity bit. In addition, the relative forwarding table is further provided.

If the address parity bit indicates an absolute address, the router system determines a transmission path from the absolute address which is recorded on the reference address field of the forwarding table shown in FIG. 4. On the other hand, if the address parity bit indicates a relative address, the router system determines a transmission path from the relative address which is recorded on the reference address field of the forwarding table shown in FIG. 4 with reference to the relative forwarding table shown in FIG. 5.

Referring to FIG. 5, the relative forwarding table includes a relative address, an address parity bit, and a reference address. The address parity bit indicates whether an address is an absolute address or a relative address. For example, an address parity bit of '1' means that the address recorded on the reference address field is an absolute address, while an address parity bit of '0' means that the address recorded on the reference address field is a relative address.

If the address parity bit indicates the absolute address, the router system determines a transmission path from the absolute address recorded on the reference address field of the relative forwarding table shown in FIG. 5. On the other hand, if the address parity bit indicates the relative address, the router system determines a transmission path from the relative forwarding table with reference to the relative address recorded on the reference address fields of the relative forwarding table.

Figure 6:
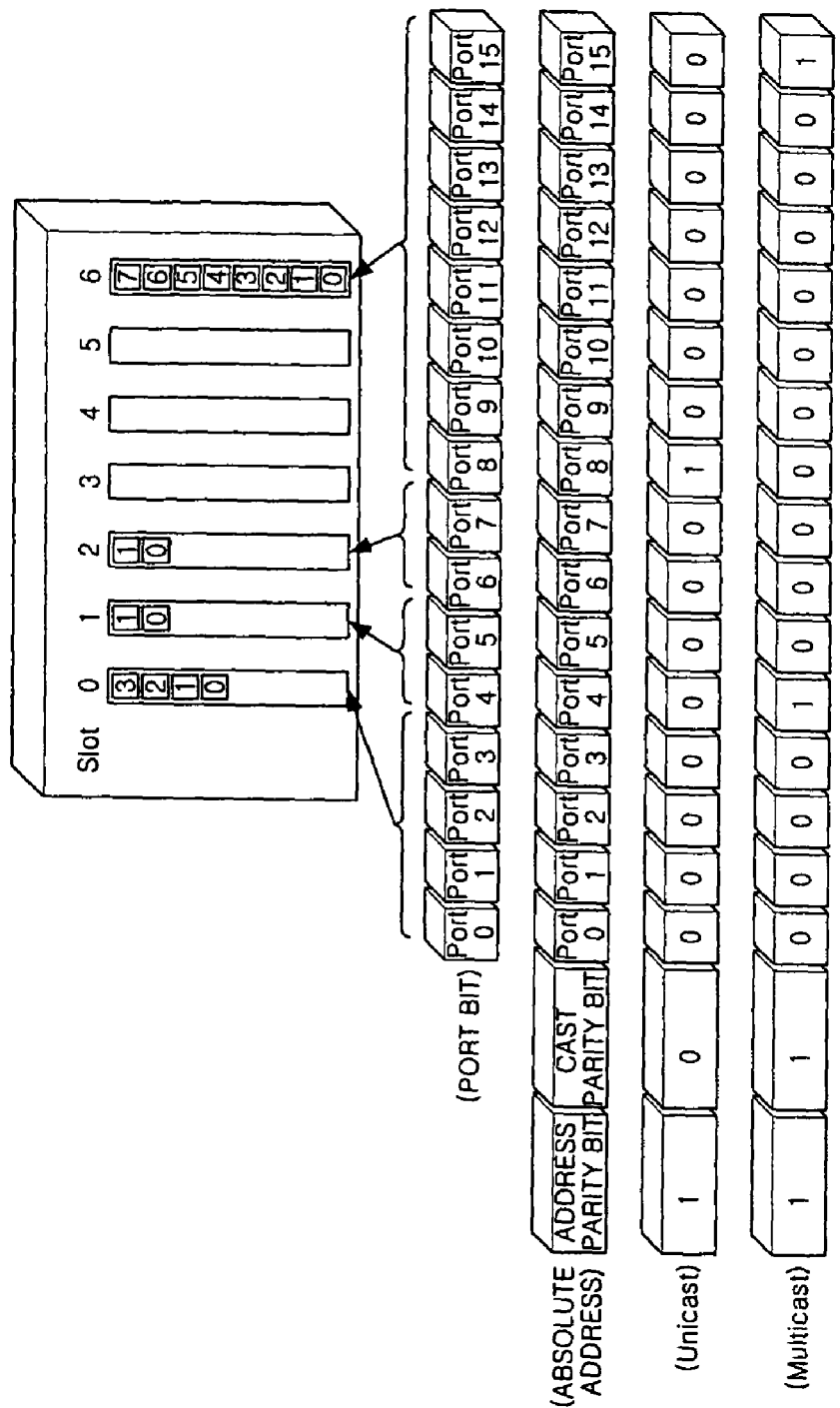
FIG. 6 is a diagram of an address system in the router system according to an embodiment of the present invention.

FIG. 6 is a diagram of an address system in the router system according to an embodiment of the present invention, which illustrates a method for setting the absolute address to be recorded on the reference address field of the forwarding table (see FIG. 4) and the relative forwarding table (see FIG. 5). As shown in FIG. 6, for example, the router system has a slot 0 having ports 0, 1, 2, and 3, a slot 1 having ports 0 and 1, a slot 2 having ports 0 and 1, slots 3, 4 and 5 being empty, and a slot 6 having ports 0, 1, 2, 3, 4, 5, 6, and 7.

The absolute address may consist of an address parity bit, a cast parity bit, and port bits. The address parity bit indicates whether an address is an absolute address or a relative address. For example, an address parity bit of '1' indicates an absolute address, and '0' indicates a relative address.

The cast parity bit indicates whether a mode is a unicast mode or a multicast mode. For example, a cast parity bit of '0' indicates a unicast mode, and '1' indicates a multicast mode. The unicast mode indicates that only one port is activated, i.e., a bit value of '1', while the multicast mode indicates that at least two ports are activated.

Figure 7:
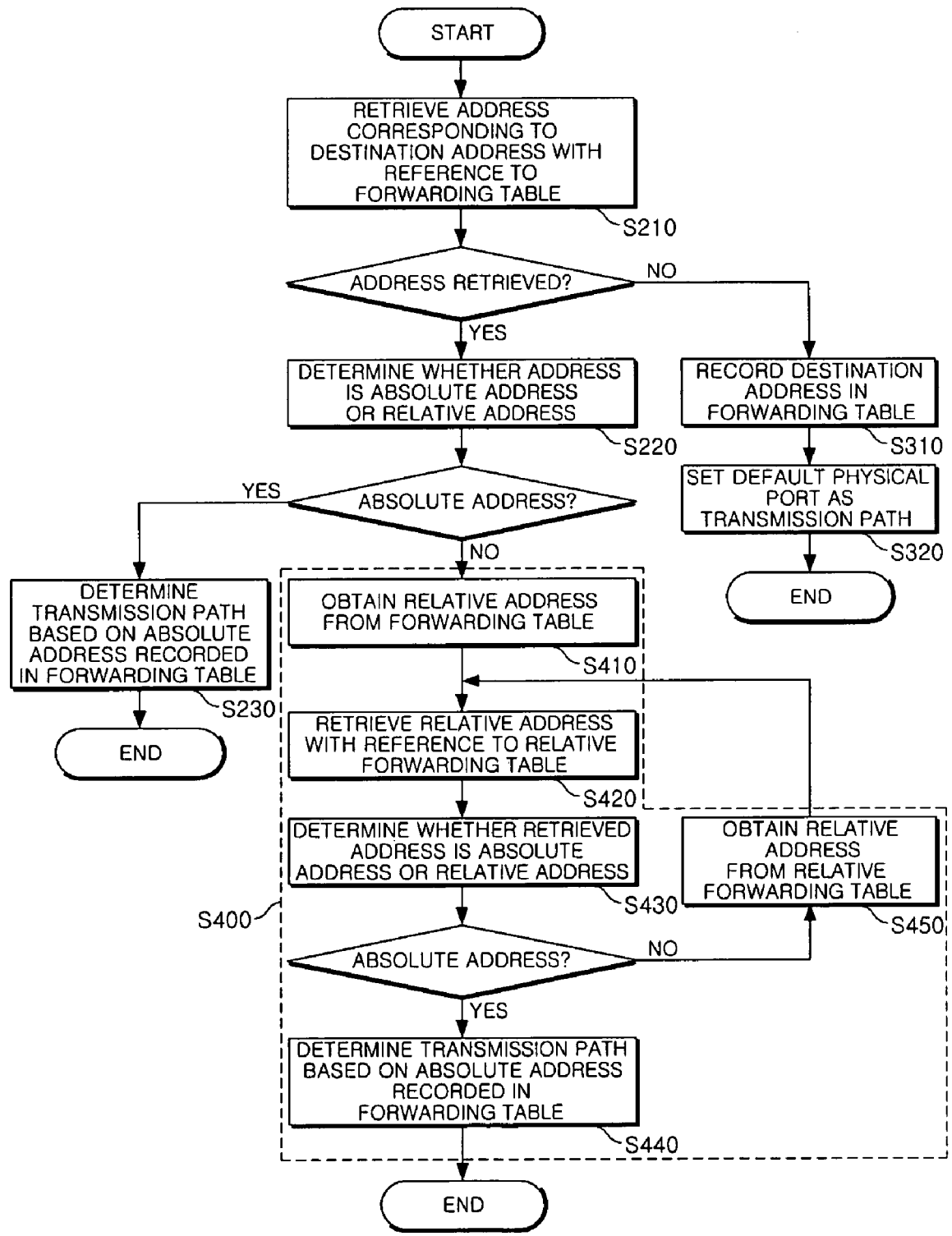
FIG. 7 is a flowchart illustrating a procedure for determining the transmission path of the router system according to an embodiment of the present invention.

FIG. 7 is a flowchart illustrating a method for determining the transmission path of the router system according to an embodiment of the present invention. The method may be embodied in a program which is executed in a routing processor (RP) for general routing control of the router system. When packet transmission is requested, the router system determines a transmission path prior to packet transmission.

In order to determine the transmission path, the router system first retrieves a destination address with reference to a forwarding table at operation S210.

As shown in FIG. 4, the forwarding table includes session participants' IP addresses and MAC addresses, address parity bits, and reference addresses. It is determined based on the address parity bit whether an address is an absolute address or a relative address. When an address parity bit corresponds to an absolute address, the absolute address is recorded on the reference address field. On the other hand, when the address parity bit corresponds to a relative address, the relative address is recorded on the reference address field. Thus, it is determined whether an address corresponding to the destination address exists in the forwarding table by comparing the destination address with the addresses recorded on the IP address field or MAC address field of the forwarding table.

If it is determined at operation S210 that the address corresponding to the destination address does not exist in the forwarding table, the router system records the destination address on the forwarding table as shown in FIG. 4 at operation S310, and determines a default physical port as the transmission path at operation S320. Here, the default physical port is set in advance.

If it is determined at operation S210 that the address corresponding to the destination address exists in the forwarding table, the router system determines whether the address is an absolute address or a relative address at operation S220. Here, it is determined whether the address is the absolute address or the relative address with reference to the address parity bit of the forwarding table as shown in FIG. 4.

If the address is determined to be an absolute address at operation S220, the router system determines the transmission path from the absolute address recorded on the forwarding table at operation S230. The absolute address is retrieved from the reference address field of the forwarding table shown in FIG. 4. Here, as shown in FIG. 6, a port having a port bit of "1" at the absolute address is determined as the transmission path. In the unicast mode, only one of the ports has a bit value of '1' at the absolute address. In the multicast mode, at least two ports have a bit value of '1' at the absolute address.

If the address is determined to be a relative address at operation S220, the router system retrieves an address, which corresponds to the relative address recorded on the forwarding table, from the relative forwarding table at operation S400.

In more detail, the router system first obtains the relative address from the forwarding table at operation S410. As shown in FIG. 4, if the address parity bit of the forwarding table indicates a relative address, the relative address is recorded on the reference address field. Therefore, the relative address can be obtained from the reference address field.

When the relative address is obtained at operation S410, the router system retrieves an address corresponding to the relative address with reference to the relative forwarding table at operation S420. As shown in FIG. 5, since the relative forwarding table includes the relative address field, the address parity bit field, and the reference address field, an address corresponding to the relative address can be retrieved from the relative address field of the relative forwarding table.

When an address corresponding to the relative address is retrieved at operation S420, the router system determines whether the retrieved address is an absolute address or a relative address at operation S430. As shown in FIG. 5, the relative forwarding table includes the relative address field, the address parity bit field, and the reference address field. Since the absolute address or relative address is recorded on the reference address field according to the address parity bit, it is determined whether the retrieved address is the absolute address or relative address on the basis of the address parity bit of the relative forwarding table.

If the address is determined to be an absolute address at operation S430, the router system determines the transmission path based on the absolute address recorded on the relative forwarding table at operation S440. Here, the absolute address is retrieved from the reference address field of the relative forwarding table as shown in FIG. 5. At this time, as shown in FIG. 6, a port having a port bit of '1' at the absolute address is determined as a transmission path. The unicast mode has only one port having a bit value of '1' at the absolute address. The multicast mode has at least two ports having a bit value of '1' at the absolute address.

If the address is determined to be a relative address at operation S430, the router system obtains the relative address from the relative forwarding table at operation S450 and returns to operation S420. Here, the relative address is retrieved from the reference address field of the relative forwarding table as shown in FIG. 5. Hence, according to the present embodiment, the router system transmits the packet using the forwarding table having the dualized address system consisting of the absolute address, which indicates the physical port, and the relative address, which indicates the location of the absolute address.

With the dualized address system of the forwarding table, the router system has only to change the absolute address in the relative forwarding table without changing the relative address when the router system experiences traffic congestion at its certain port or when the router system requires load balancing. The router system can therefore effectively deal with real-time changes in the destination address.

Furthermore, since only the absolute address in the relative forwarding table needs to be changed without changing the relative address, the forwarding table having the dualized address system is particularly preferable in the multicast communication where session participants (subscribers) frequently join and withdraw and the forwarding table has to be changed accordingly.

Figure 8:
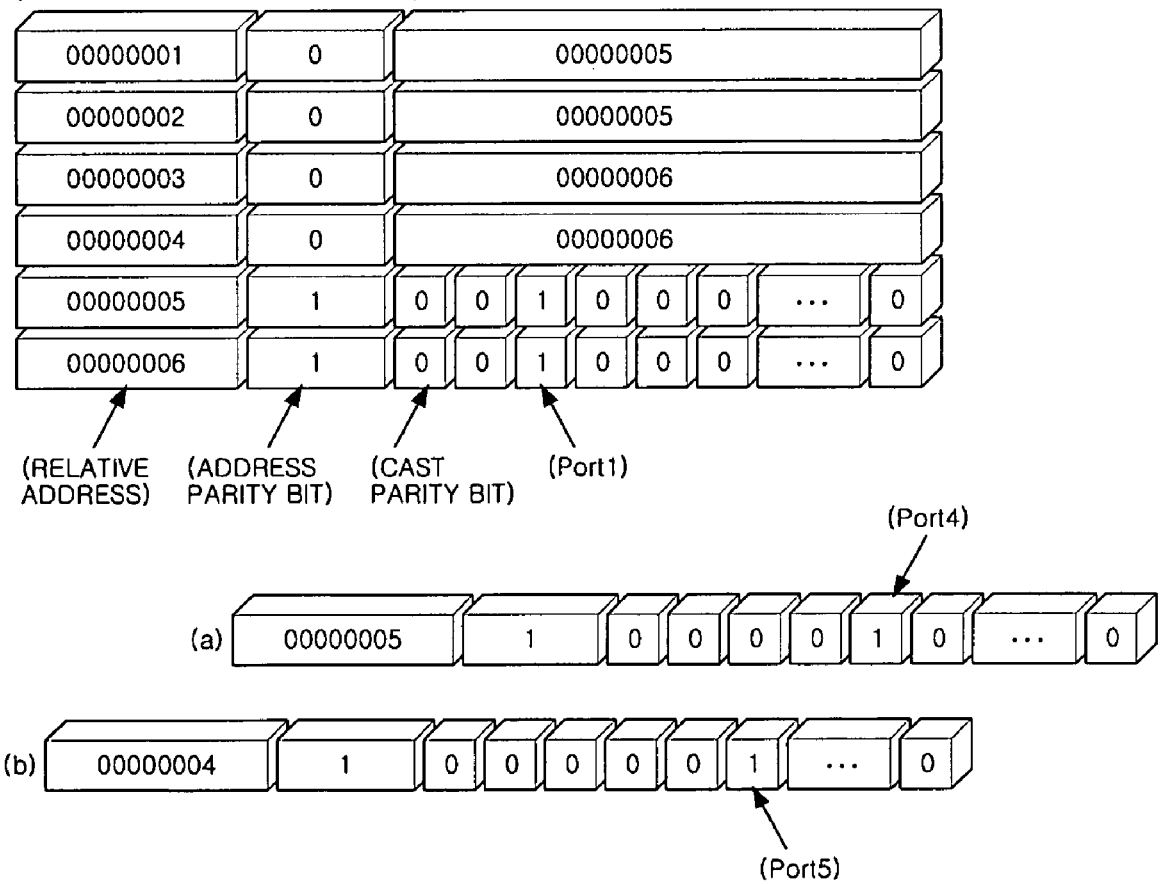
FIG. 8 illustrates a forwarding table managed with a dualized address system.

Hereinafter, the forwarding table having the dualized address system will be described with reference to FIG. 8. FIG. 8 illustrates a forwarding table with a dualized address system.

For instance, in preparation for traffic congestion, a first group consisting of two registered IP addresses, '10.0.0.0/24' and '40.0.0.0/24,' and a second group consisting of two registered IP addresses, '20.0.0.0/24' and '30.0.0.0/24' are provided, the destination of the two groups being set to port 1.

The forwarding table shows that address parity bits of the IP addresses '10.0.0.0/24,' '20.0.0.0/24,' '30.0.0.0/24,' and '40.0.0.0/24' are set to '0' which indicates a relative address, and the first and second groups are configured to make reference to relative addresses of '00000001' and '00000004,' respectively.

Further, the relative forwarding table shows that address parity bits of the relative addresses '00000001,' '00000002,' '00000003,' and '00000004' are set to '0' which indicates a relative address, and address parity bits of the relative addresses '00000005' and '00000006' are set to '1' which indicates an absolute address. Here, destination addresses of the relative addresses '00000001' and '00000002' are set to '00000005' and destination addresses of the relative addresses '00000003' and '00000004' are set to '00000006'.

If traffic congestion occurs on the IP address of '10.0.0.0/24' and the destination of the first group thus has to be changed to '4' (port 4) for load balancing, for example, the absolute address of '00000005' in the relative forwarding table is changed to port 4 as shown in (a) of FIG. 8.

If heavy traffic congestion occurs on the IP address of '30.0.0.0/24' and thus the destination of the first group needs to be changed to port 5, for example, the address of '00000004' in the relative forwarding table is changed to the address parity bit for the absolute address as shown in (b) of FIG. 8 and the absolute address is changed to '5' (port 5).

As such, the router system according to the present invention provides the forwarding table managed with a dualized address system including an absolute address indicating the physical port and a relative address indicating the location of the absolute address in pocket transmission, so that only the absolute address in the relative forwarding table can be changed, without changing the relative address when traffic congestion occurs on a certain port of the router system or when load-balancing is needed. Thus, it is possible to actively cope with real-time changes in destination address. Particularly, during multicast communication where session participants (subscribers) join and withdraw frequently, it is easy to manage the records of the forwarding table, which has to be continuously changed according to joining and withdrawal of the session participants (subscribers). As such, the present invention can be advantageous in a multicast environment.

Moreover, the router system according to the present invention employs the relative forwarding table, i.e., an indirect address system, so that a destination address to be recorded on the forwarding table can be simplified and standardized, thereby improving memory efficiency. Application of the standardized destination record to a routing protocol enables address recording in a hardware layer, reducing network load.

As such, the present invention is applicable to determination of a transmission path of a router system and load-balancing.

As apparent from the above description, the method according to the present invention allows a forwarding table to be managed with a dualized address system, which includes an absolute address indicating a physical port and a relative address indicating a location of the absolute address, in pocket transmission of a router system, so that the router system can change only the absolute address in the relative forwarding table without changing the relative address, when traffic congestion occurs on a certain port of the router system or when load-balancing is needed, thereby actively coping with real-time change of a destination address.

Further, since only the absolute address in the relative forwarding table is changed without changing the relative address, needs to be continuously changed according to joining and withdrawal of session participants (subscribers), in the case of multicast communication where joining and withdrawal of participants (subscribers) occur frequently. As such, the present invention is more advantageous in a multicast environment.

Although the present invention has been described with reference to the embodiments and the accompanying drawings, the present invention is not limited to the embodiments and the drawings. It should be understood that various modifications and changes can be made by those skilled in the art without departing from the spirit and scope of the present invention as defined by the accompanying claims.

What is claimed is:

1. A method for determining an Internet packet transmission path of a router system, comprising:
retrieving an address corresponding to a destination address with reference to a forwarding table of a router;
if the address corresponding to the destination address exists in the forwarding table, determining whether the address in the forwarding table is an absolute address or a relative address, wherein the absolute address corresponds to a physical port and the relative address corresponds to a location of the absolute address; and
if the address corresponding to the destination address is an absolute address, determining a transmission path based on the absolute address in the forwarding table,
if the address corresponding to the destination address is a relative address, retrieving from a relative forwarding table an address corresponding to a relative address in the forwarding table,
wherein the forwarding table comprises: an internet protocol (IP) address field and a media access control (MAC) address field of session participants;
an address parity bit field for identifying an absolute address or a relative address; and
a reference address field where the absolute address or the relative address is recorded according to the address parity bit.

2. The method of claim 1, wherein retrieving from a relative forwarding table an address corresponding to a relative address in the forwarding table comprises:
obtaining a relative address from the forwarding table;
if the relative address is obtained, retrieving an address corresponding to the relative address with reference to the relative forwarding table;
if the address corresponding to the relative address is retrieved with reference to the relative forwarding table, determining whether the retrieved address is an absolute address or a relative address; and
if the retrieved address is determined to be an absolute address determining a transmission path based on an absolute address in the relative forwarding table.

3. The method of claim 2, further comprising:
if the address is determined to be a relative address, obtaining a relative address from the relative forwarding table and retrieving an address corresponding to the relative address with reference to the relative forwarding table.

4. The method of claim 2, wherein the relative forwarding table comprises:
a relative address field where a relative address is recorded;
an address parity bit field for identifying whether an address is an absolute address or a relative address; and
a reference address field where an absolute address or a relative address is recorded according to the address parity bit.

5. The method of claim 4, wherein determining whether the retrieved address is an absolute address or a relative address if the address corresponding to the relative address is retrieved with reference to the relative forwarding table comprises determining whether the retrieved address is an absolute address or a relative address with reference to the address parity bit of the relative forwarding table.

6. The method of claim 4, wherein determining a transmission path based on an absolute address recorded on the relative forwarding table if the retrieved address is determined to be an absolute address comprises determining a transmission path based on an absolute address recorded in a reference address field of the address corresponding to the destination address existing in the relative forwarding table.

7. The method of claim 1, further comprising:
if the address corresponding to the destination address does not exist in the forwarding table, recording the destination address in the forwarding table and determining a default physical port as the transmission path.

8. The method of claim 1, wherein retrieving an address corresponding to a destination address with reference to a forwarding table comprises retrieving an address corresponding to a destination address by comparing the destination address with IP addresses or MAC addresses.

9. The method of claim 1, wherein determining whether the address is an absolute address or a relative address if the address corresponding to the destination address exists in the forwarding table comprises determining whether the address is an absolute address or a relative address with reference to an address parity bit of the address corresponding to the destination address in the forwarding table.

10. The method of claim 1, wherein determining a transmission path depending on an absolute address recorded in the forwarding table if the address corresponding to the destination address is an absolute address comprises determining a transmission path depending on an absolute address recorded on a reference address field of the address corresponding to the destination address existing in the forwarding table.

* * * * *